United States Patent [19]
Honkasalo et al.

[11] Patent Number: 6,097,965
[45] Date of Patent: Aug. 1, 2000

[54] VARIABLE RATE CIRCUIT-SWITCHED TRANSMISSION SERVICES IN CELLULAR RADIO SYSTEMS

[75] Inventors: Zhichun Honkasalo, Bedford, Tex.; Esa Malkamäki, Espoo, Finland; Harri Honkasalo, Bedford, Tex.

[73] Assignees: Nokia Telecommunications OY; Nokia Mobile Phones Ltd., both of Espoo, Finland

[21] Appl. No.: 08/981,839

[22] PCT Filed: Jul. 11, 1996

[86] PCT No.: PCT/FI96/00409

§ 371 Date: Jan. 9, 1998

§ 102(e) Date: Jan. 9, 1998

[87] PCT Pub. No.: WO97/03403

PCT Pub. Date: Jan. 30, 1997

[30] Foreign Application Priority Data

Jul. 12, 1995 [FI] Finland ................................ 953414

[51] Int. Cl.⁷ ........................................ H04Q 7/20
[52] U.S. Cl. ...................... 455/550; 455/550; 455/63; 455/522
[58] Field of Search ...................... 455/550, 560, 455/574, 515, 522, 523, 63; 370/465, 466, 467, 468; 371/5.1, 5.5

[56] References Cited

U.S. PATENT DOCUMENTS

| | | | |
|---|---|---|---|
| 5,414,796 | 5/1995 | Jacobs et al. | 395/2.3 |
| 5,420,863 | 5/1995 | Taketsugu et al. | 370/95.3 |
| 5,502,721 | 3/1996 | Pohjakallio | 370/60.1 |
| 5,539,744 | 7/1996 | Chu et al. | 370/60 |
| 5,592,490 | 1/1997 | Barratt et al. | 370/310 |
| 5,621,723 | 4/1997 | Walton, Jr. et al. | 370/18 |

FOREIGN PATENT DOCUMENTS

| | | |
|---|---|---|
| 548 939 | 6/1993 | European Pat. Off. . |
| 709 973 | 5/1996 | European Pat. Off. . |
| 94/18756 | 8/1994 | WIPO . |
| 95/12943 | 5/1995 | WIPO . |

*Primary Examiner*—Daniel S. Hunter
*Assistant Examiner*—Thuan T. Nguyen
*Attorney, Agent, or Firm*—Pillsbury Madison & Sutro

[57] ABSTRACT

The invention relates to methods, transmitters and transceivers for transmitting a user signal, particularly a speech or video signal on a circuit-switched connection in a cellular radio network when the bit rate of the user signal varies during transmission. The transmitter comprises a source (2) of a variable bit rate user signal, such as speech or video encoder, and a channel encoder (3) and a radio transmitter unit (7) having an adjustable transmitting power. The capacity allocated for the circuit-switched connection corresponds to the maximum rate of the user signal. The channel encoder (3) has, for the maximum bit rate of the user signal, a first, relatively the least efficient channel coding or no channel coding at all, and for each lower bit rate of the user signal a relatively more efficient channel coding that utilizes the capacity of the circuit-switched connection, released by the lower transfer rate, for improving the interference tolerance of the connection. The transmitting power of the radio transmitter unit depends on the channel coding used by the channel encoder so that the transmitting power is reduced with the increased efficiency of the channel coding, while the bit-error-rate remains substantially constant. This results in a lower average power level and thus in a reduced interference level in the cellular network.

11 Claims, 5 Drawing Sheets

| SPEECH CODING RATE | CHANNEL CODING RATE | TOTAL RATE R = CONSTANT | TRANS- MITTING POWER |
|---|---|---|---|
| S1 | C1 | R=S1+C1 | P1 |
| S2 | C2 | R=S2+C2 | P2 |
| S3 | C3 | R=S3+C3 | P3 |
| S4 | C4 | R=S4+C4 | P4 |
| S5 | C5 | R=S5+C5 | P5 |

VARIABLE RATE CIRCUIT-SWITCHED TRANSMISSION SERVICES IN CELLULAR RADIO SYSTEMS

This application is the national phase of international application PCT/FI96/00409 filed Jul. 11, 1996 which designated the U.S.

BACKGROUND OF THE INVENTION

1. Field of the Invention

The invention relates to a technique for providing circuit-switched bearer services in cellular radio systems.

2. Related Art

The capability to support variable-rate circuit-switched bearer services is one of the most important features of the digital mobile communications systems of the third generation. This requirement comes from those applications in which the source data transfer rate varies with time, but not exactly in a "bursty" form. Such a data transfer rate that varies in a "bursty" form with time may normally be supported by packet-switched access bearer services, whereas the variable-rate services still require maintaining the connection in a circuit-switched form. Example applications include variable-rate speech codecs and variable-rate video codecs. Normally, the variable rate of these codecs may be limited to a number of fixed data transfer rate values, but the required speed of variation can be remarkably high, such as from one speech or video frame to the next.

The advantage of these codecs is that the quality of speech and video may be maintained almost as good as if they were operating at the peak data transfer rate, while the average data transfer rate is lower than the peak data transfer rate. This requires, however, the bearer services that support these codecs to be able to vary their transmission rate over the air interface so that the redundant radio channel capacity can be released for other users when the source data transfer rate is reduced from its peak. Otherwise, the use of these variable-rate codecs would not be of any benefit to the system or the network because the factor that limits the capacity of the system is the user peak rate.

The present-day generation of digital mobile communications systems does not support variable-rate circuit-switched bearer services, although in principle any required changes in the user interface rate may be taken into account by means of the handover procedure, during which the connection is handed over to another bearer service, which is often associated with allocating a radio channel resource. This procedure is slow and it cannot be used for supporting any rapid changes in the user source bit rate, such as changes produced e.g. by variable-rate speech or video codec.

A discontinuous transmission (DTX) is another way of achieving the variation of data transfer rate in present-day mobile communications systems. DTX refers to a method by means of which the transmission to the radio path may be interrupted for the duration of pauses occurring in speech. This aims at reducing the consumption of power in transmission, which is absolutely essential to mobile telephones, and the general interference level on the radio path, which has an effect on the capacity of the system. In the pan-European digital mobile communications system, GSM, for instance, a transmitter (a mobile station or base station) usually transmits one traffic burst per each TDMA frame (that is 96 bursts/480 ms) until the speech codec detects a silent period in the speech signal. The transmitter thus transmits only 12 bursts/480 ms. This saves the transmitting power and reduces interference caused to other co-channel users.

Because the radio resources are allocated in mobile communications systems in form of time-slots by the base station controller or the mobile services switching centre, it is not easy to re-use the released radio capacity immediately for other users when the source data transfer rate is reduced. Likewise, it is not easy either to take additional radio capacity into use immediately when the source rate increases. This means that no significant benefit is obtained e.g. from the use of variable-rate speech and video codecs in a mobile communications system from the network point of view.

SUMMARY OF THE INVENTION

The object of the invention is a mobile communications system that supports variable-rate circuit-switched bearer services in a way that improves the performance of the mobile communications system.

This is achieved with a method of the invention for transmitting a user signal, particularly a speech or video signal on a circuit-switched connection in a cellular radio network when the bit rate of the user signal varies during transmission, said method being characterized by allocating the circuit-switched connection a capacity that corresponds to the maximum bit rate of a variable-rate user signal, using the extra capacity of the circuit-switched connection for improving the interference tolerance of the connection when the bit rate of the user signal is lower than said maximum bit rate, reducing the transmitting power in proportion to the improved interference tolerance when the bit rate of the user signal is lower than said maximum bit rate.

The invention further relates to cellular radio networks set forth in claims 5 and 6.

The invention further relates to a transmitter set forth in claim 7 and a transceiver set forth in claim 8.

The approach provided by the present invention for utilizing variable-rate circuit-switched speech or data transmission is quite different from the prior art solutions. When the user source rate is reduced from its peak value, the redundant radio capacity, that is, a time-slot or a part of it is not released from this user. It is thus not attempted to allocate the "extra" radio capacity for other users. Instead, the redundant radio capacity is used for more effective channel coding or bit repetition in order to maintain a constant total bit rate. Simultaneously, the transmitting power used in the time-slot is reduced in accordance with the amount of the improved coding gain. This aims at maintaining a substantially constant expected bit-error-rate for all the transmitted information bits regardless of the actual source rate. As a result, the mobile communications system will benefit from the reduced interference level, which is based on the same principle as discontinuous transmission. In fact, the interference level of the mobile communications network will become the same as in cases in which every user is operating at the average bit rate, which means that the radio capacity of the system is now controlled by the average user rate, not the peak rate as in the prior art system. This concept has also been verified by means of network simulations, where, assuming the average rate of each user to be a half of their peak rate, an improvement of some 50% in the capacity may be realized due to the reduced interference level and thus the re-use factor. The re-use factor indicates, in terms of the number of cells, the intervals at which the same frequencies re-occur in the mobile communications network.

DETAILED DESCRIPTION OF THE INVENTION

Figure 1:
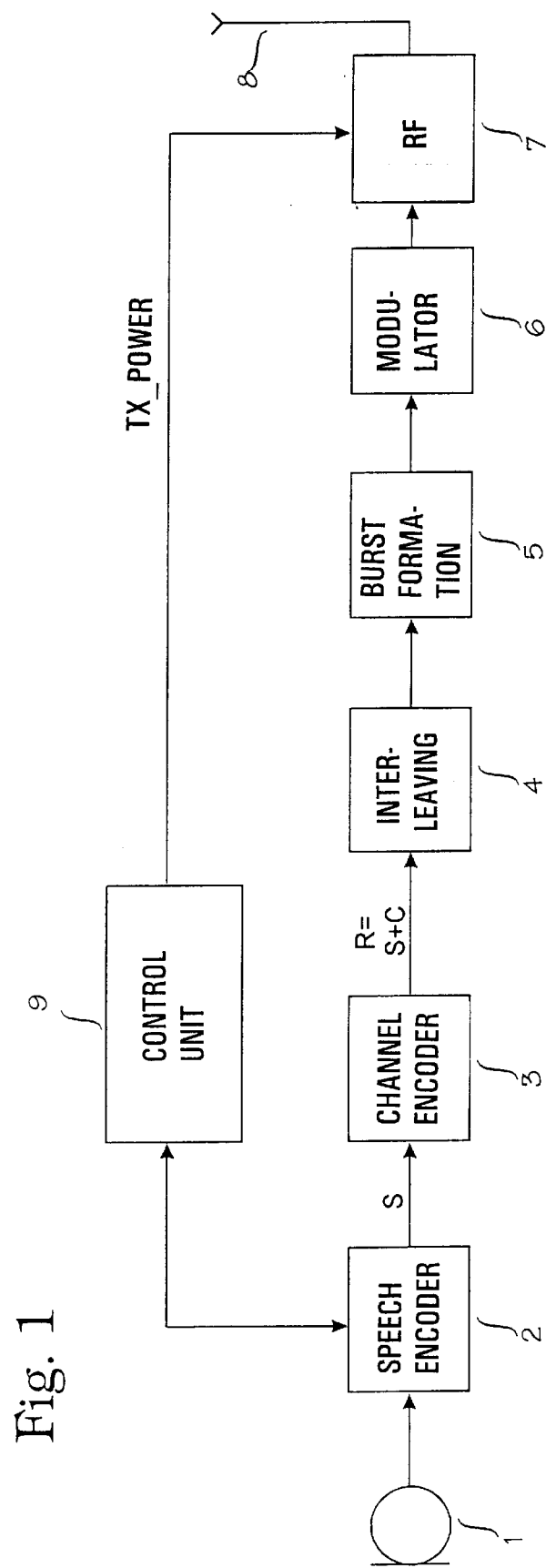
Figure 2:
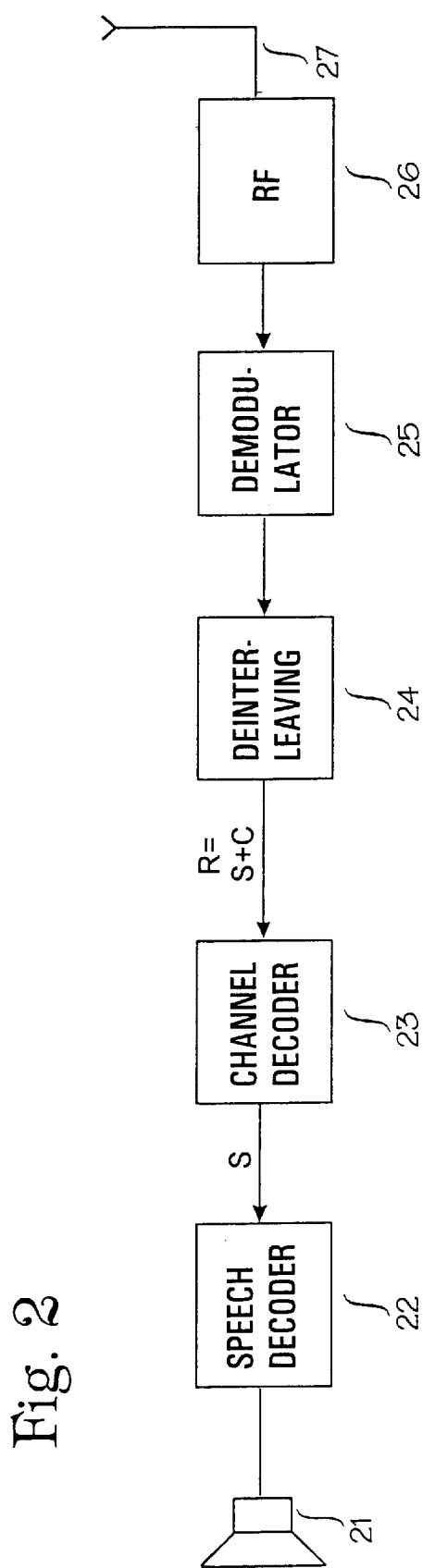
Figure 3:
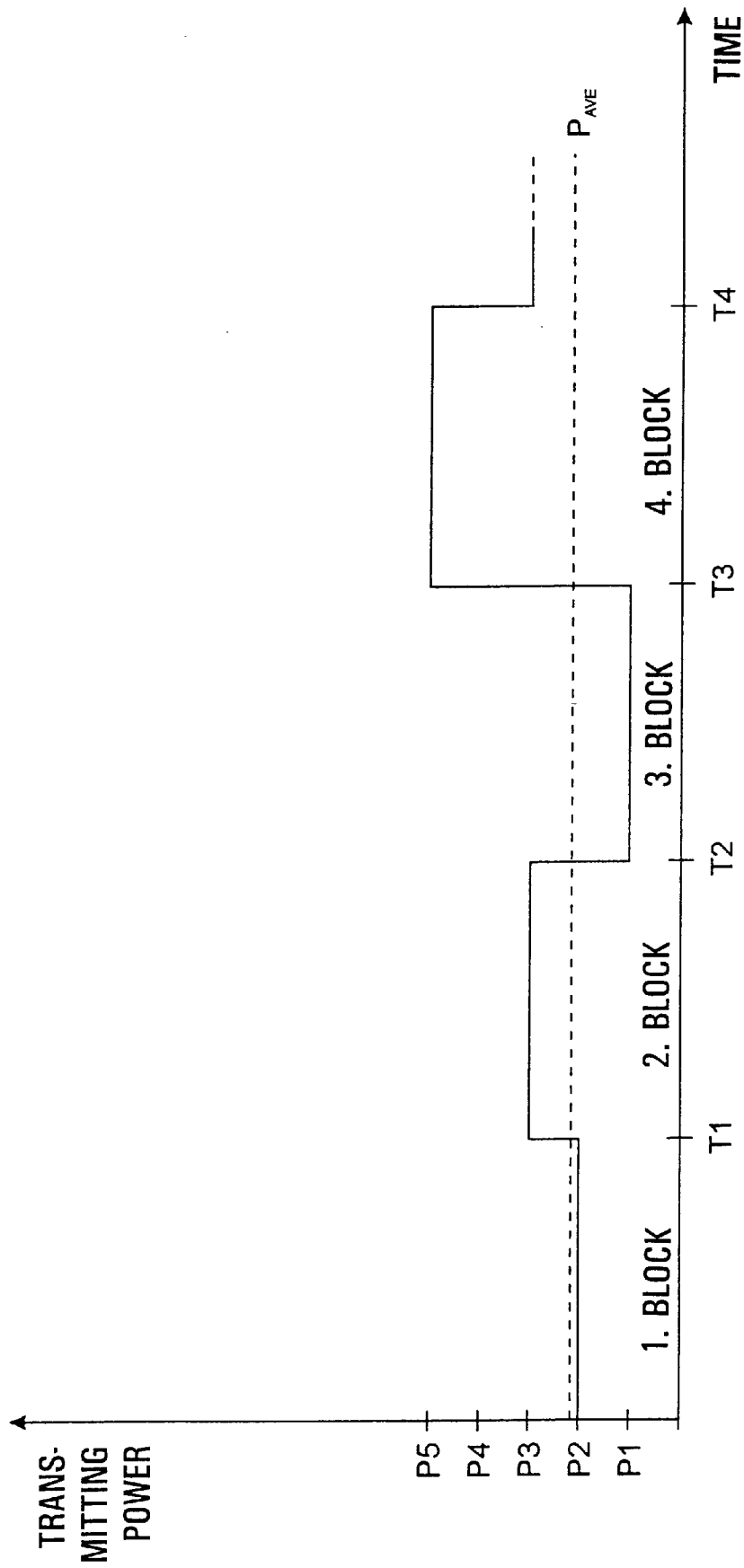
Figure 4:
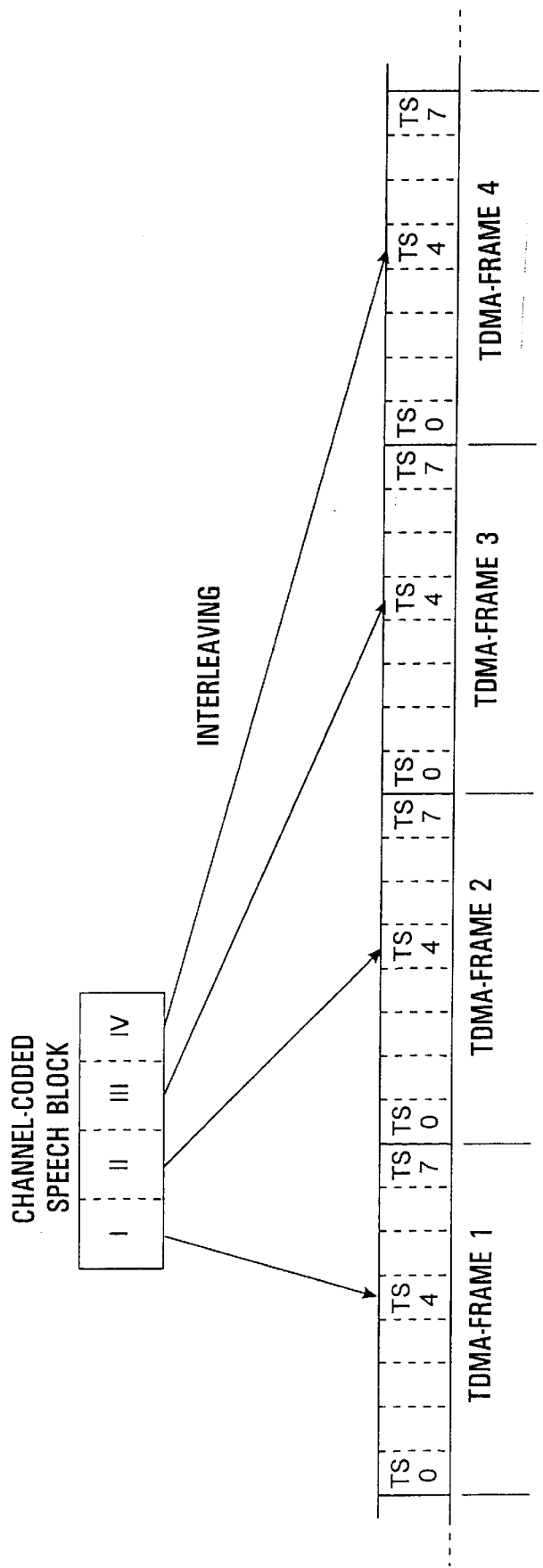

In the following, the invention will be described by means of the preferred embodiments of the invention with reference to the attached drawings, in which FIG. 1 shows a block diagram of a variable-rate transmitter of the invention, FIG. 2 shows a block diagram of a variable-rate receiver of the invention, FIG. 3 shows a graph illustrating the transmitting power as a function of time in the transmitter of the invention, and FIG. 4 is a diagram illustrating interleaving of the speech block.

FIG. 5 is a table showing the operation of embodiment of the invention.

DETAILED DESCRIPTION OF THE PRESENT INVENTION

The invention is suited for digital mobile communications systems that support variable-rate circuit-switched speech or data transmission. The invention is particularly well suited for use in association with variable-rate speech or video codecs.

The present invention can generally be applied to multiple-access schemes and traffic channels of various kinds. A physical concept of a traffic channel varies in different multiple-access methods, being primarily determined by means of a time-slot in TDMA systems, by means of a spreading code in CDMA systems, by means of a radio channel in FDMA systems, by means of a combination of the above etc. The basic idea of the present invention is, however, independent of the type of the traffic channel and the multiple-access method employed.

In the following, the invention will be illustrated by means of variable-rate speech transmission and speech coding, but the same principles apply to variable-rate video transmission or data transmission.

In digital telecommunication systems used for transmitting speech, the following two coding operations are usually directed to the speech signal: speech coding and channel coding.

Speech coding consists of speech encoding carried out in a transmitter (FIG. 1) by a speech encoder 2, and speech decoding carried out in a receiver (FIG. 2) by a speech decoder 22. A speech signal coming from a microphone 1 is compressed in the speech encoder 2 so that the number of bits per time unit required for representing the signal is reduced, whereby the transmission capacity required for transmitting the speech signal is reduced as well. The speech decoder 22 located in the receiver carries out a reverse operation and synthesizes the speech signal from bits produced by the speech encoder 2. The synthesized speech signal is applied to a loudspeaker 21. In the present-day mobile communications systems, the transmission rate provided by the speech coder is usually constant. In the pan-European mobile communications system GSM (Global System for Mobile Communication), for instance, a speech encoder for a full-rate traffic channel compresses a speech signal down to a transmission rate of 13 kbit/s. The speech encoder 2 according to the invention is, however, a variable-rate encoder so that the transmission rate (speech bits/second) provided by the encoder 2 may vary according to the amount of the speech information to be transmitted. The variable rate of such encoders is usually limited to a set of fixed data transfer rate values. In the embodiment of the invention shown in FIGS. 1–5, the possible data transfer rates of the speech frames, provided by the speech encoder 2 are S1, S2, S3, S4 and 5. However, the invention is not limited to any specific number of rates, but the number may vary from two to infinity. The transmission rate of the speech signal produced by the speech encoder 2 may be determined speech frame-specifically, that is, two successive speech frames may have different transmission rates S. The variation speed of the transmission rate is not essential from the point of view of the invention, however, and the invention is by no means limited to the above example. The precise format of the of the speech frames produced by the speech encoder 2 is not essential to the invention either. An example of the format of the speech frame is a speech frame of the GSM mobile communications system, described in chapter 06. in the GSM recommendations.

Channel coding consists of channel encoding carried out in the transmitter (FIG. 1) by a channel encoder 3, and channel decoding carried out in the receiver (FIG. 2) by a channel decoder 23. The purpose of channel coding is to protect the speech coding bits to be transmitted from errors occurring in the transmission channel. By means of channel coding, it is possible either to merely detect whether errors have occurred in the speech coding bits during transmission, without having any capability to correct them, or channel coding may be capable of correcting the errors occurred in transmission, provided that the number of errors is smaller than a specific maximum number that depends on the channel coding method.

The selection of the channel coding method used depends on the quality of the transmission channel. In fixed transmission networks, the probability of errors is often very small and the channel coding required is slight. In wireless networks, such as mobile networks, in turn, the error probability of the transmission channels is extremely high, and the effect of the used channel coding method on the achieved speech quality is significant. In mobile networks, both error-detecting and error-correcting channel coding methods are usually employed simultaneously.

In the following, the operation of channel coding will be disclosed by means of an example. The bits (speech frames) produced by the speech encoder 2 are applied to the channel encoder 3, which adds to them a number of error check bits. The final transmission rate on the radio path is the sum of speech coding bits and channel coding bits per time unit. As an example of channel coding, channel coding of a full-rate transmission channel in the GSM system may be mentioned. Speech coding bits produced by the speech encoder and having the transmission rate of 13 kbit/s are processed with an error-correction algorithm, which causes an increase of 9.8 kbit/s in the transmission rate, which results in the total transmission rate of the speech signal of 22.8 kbit/s in the traffic channel. The channel decoder decodes channel coding in the receiver so that only the bit stream 13 kbit/s produced by the speech encoder is applied to the speech decoder. In connection with the channel decoding, the channel decoder detects and/or corrects errors occurring in the channel if possible. In the GSM system, convolution coding is employed, the effectiveness of which may be expressed by means of a convolution coding ratio X/Y indicating that in the channel coding, X information bits are represented by Y code bits.

In accordance with the invention, the channel encoder 3 has a plurality of channel codings which are selected according to the transfer rate S provided by the speech encoder 2 so that the transmission rate R at the radio interface is substantially constant. In the embodiment of FIG. 1, a control unit 9 selects the channel coding of the channel encoder 3 on the basis of information obtained from the speech encoder 2, said information indicating the transmission rate used in the speech frame.

Channel-coded speech blocks produced by the channel encoder 3 are interleaved in an interleaver 4. As a result of the interleaving, the speech block is transmitted in more than one time-slot, whereby transient interferences occurring in a single time-slot, such as fast fadings on the radio path, do not totally destroy the contents of the speech block. FIG. 3 illustrates a way of interleaving which is used in the preferred embodiment of the invention. The upper part of FIG. 4 shows a channel coded speech block produced by the encoder 3, the length of the speech block after the channel coding being four times the length of a data field of one time-slot. Portions having the length of one data field of a channel coded speech block are illustrated with sub-blocks I, II, III and IV in FIG. 4. The bits of sub-blocks I, II, III, and IV may be in the order provided by channel coding, or, as in the preferred embodiment of the invention, the interleaver 7 mixes the order of the bits of the speech block according to a certain mixing algorithm, whereby the transmission errors are randomized over the entire channel coded speech block. This results in a uniform bit-error-rate over the entire speech block. The lower part of FIG. 4 illustrates in the time domain a TDMA signal transmitted on one carrier wave, said signal consisting of TDMA frames recurring one after another. Each TDMA frame consists of eight time-slots TS0–TS7. Assume that in the case of the example, a circuit-switched connection has been established on a traffic channel that is using time-slot TS4. The interleaver 4 thus inserts the sub-blocks of the channel coded speech block into time-slot TS4 in four successive TDMA frames 1, 2, 3 and 4. More precisely, sub-block I of the speech block is inserted in time-slot TS4 in TDMA frame 1, sub-block II in frame 2, sub-block III in frame 3 and sub-block IV in frame 4. As a result of interleaving, the speech block is transmitted over the radio interface in at least four time-slots, whereby the received bits are also divided into at least four classes according to the bit-error-rate. A strong interference occurring in time-slot TS4 of frame 2, for instance, only worsens the bit-error-rate of sub-block II while that of sub-blocks I, II, III and IV remains good. In the receiver, the interleaver 24 carries out reverse operations. In other words, it collects sub-blocks I, II, III and IV from time-slot TS4 of four successive TDMA frames 1, 2, 3 and 4 and generates a channel coded speech block from them. In case the bits of a channel coded speech block have been mixed in the interleaver 4 prior to transmission, the deinterleaver 24 returns the initial order of the bits with the same algorithm. As a result of these operations, e.g. the interference that occurred in time-slot TS4 of TDMA frame 2 appears only as single bit errors in the channel coded speech frame. Such single bit errors, in turn, can be easily corrected by means of the channel decoder 23, to which the deinterleaver 24 supplies the received channel coded speech block.

It must be noted that the present invention does not require interleaving, and it may thus be omitted without this having any effect on the operation according to the invention. However, interleaving is an important function from the point of view of the performance of the radio system, and it has thus been included in the description of the preferred embodiment of the invention. The described interleaving method, however, is only an example and the invention may be applied in connection with all interleaving methods, with one exception. In the invention, only one channel coding and transmitting power are used within one speech block. Therefore, it is possible to transmit bits of only one channel coded speech block in one time-slot. It is not advantageous to employ block interleaving, in which adjacent speech blocks are interleaved for transmission within the same time-slot, because in such a case it is not possible to select channel coding and transmitting power freely in the adjacent blocks. This kind of block interleaving is presently used in the GSM mobile communications system.

In accordance with the invention, a plurality of different channel codings with different error correction abilities are available in the channel decoder 23 of the receiver (FIG. 2), from which channel codings the channel decoder 23 must select the correct one for each speech frame. The change in the data transfer rate, and thus the channel coding and the change in the power level related thereto are each time activated automatically by the transmitter of the party whose source bit rate has changed. Because data connections are usually bidirectional (a duplex connection), the data transfer rates in the different transmission directions, the channel coding and the transmitting power may vary independently of each other. A transmitter that changes its data transfer rate must inform the receiving end which specific data transfer rate and thus which channel coding and power level are used in the speech frame in question. This rate information may be transmitted in form of in-band signalling, either for indicating the actual rate or merely for indicating when a change occurs in the rate.

An alternative way, which is also employed by the receiver (FIG. 2) according to the preferred embodiment of the invention, is to detect a specific data transfer rate and thus a specific channel coding and power level only at the receiving end without employing any specific signalling from the transmitter to the receiver. In the preferred embodiment of the invention, the channel decoder 23 buffers the channel coded speech frame received from the deinterleaver 24 and tests on the speech frame every channel coding available in the channel decoder. In such a case, only the channel coding employed by the channel encoder of the transmitter provides a detection result having a sufficiently good bit-error-rate while the other channel decodings tested are rejected due to excessive detection errors.

From the interleaver 4 the TDMA frames according to FIG. 4 are applied to a burst former 5, which forms a short burst, a bit sequence, to be transmitted in each time-slot TS0–TS7. An example of such a burst is a burst employed on the traffic channel of the GSM system. A formed burst modulates a RF modulator 6, which forms a corresponding radio frequency burst. The formed radio frequency burst is applied via radio frequency elements, such as a power amplifier and a combiner, to a transmitter antenna 8 to be transmitted to the radio path. Blocks 5, 6, 7 and 8 may be implemented e.g. by means of radio frequency elements presently used in the GSM mobile phones of Nokia Mobile Phones Inc. and in the base stations of Nokia Telecommunications Inc. A radio frequency element 7 also comprises an adjustable attenuator and/or amplifier which adjusts the RF power level passing to the antenna 8 according to a control signal TX_POWER. The control signal TX_POWER is generated by means of a control unit 9 according to the user rate of the speech encoder 2 and/or the channel coding of the channel encoder 3, as will be described below in closer detail.

In the receiver the RF signal received by a receiver antenna 27 is applied via radio frequency (RF) elements 26 to a demodulator 25, at which the received bursts are demodulated onto the baseband frequency. From the demodulator 25, a frame structure according to the lower part of FIG. 4 is supplied to a deinterleaver 24, said frame structure being processed by the deinterleaver 24 in the manner described above.

In the following, the operation of the transmitter and the receiver according to FIGS. 1 and 2 will be disclosed by means of an example. With reference to FIG. 5, assuming that the speech encoder 2 and the speech decoder 22 have five speech coding rates available, i.e. S1, S2, S3, S4 and S5, wherein S1<S2<S3<S4<S5, that is, S5 is the maximum rate and S1 is the minimum rate. Correspondingly, the channel encoder 3 and the channel decoder 23 have five different channel codings, and the increases in the transfer rate caused by said channel codings are C1, C2, C3, C4 and C5 so that the total transfer rate R at the output of the channel encoder 3 and at the input of the channel decoder 23 is substantially constant. The increase in the transfer rate, caused by channel coding is herein referred to as channel coding rate. In other words, the channel coding, or channel coding rate (the worst channel coding) that causes the smallest increase in the transfer rate corresponds to the maximum speech coding rate S5, and the highest channel coding rate C1 (the most effective channel coding) corresponds to the lowest speech coding rate S1. Consequently, C1>C2>C3>C4>C5. It is possible in some applications that there is no channel coding at all for the maximum speech coding S5, that is, C5=0. Again, a specific RF transmitting level P1, P2, P3, P4 and P5 corresponds to each pair of speech coding rate/channel coding rate S1/C1, S2/C2, S3/C3, S4/C4 and S5/C5, wherein P1>P2>P3>P4>P5. In other words, at a low speech coding rate S1, a high channel coding rate C1 (effective error correction) and a low transmitting power P1 are employed.

The speech coding rate S, the channel coding rate C and the transmitting power P advantageously vary from one speech block to another. This is illustrated with the diagram in FIG. 3. During the time period 0—T1, the first speech block is transmitted, for which the speech coding rate S2, the channel coding rate C2 and the transmitting power P2 are employed. In the second speech block, speech encoder 2 employs a higher speech coding rate S3, whereby the control unit 9 selects for the channel encoder 3 the channel coding rate C3 and directs the RF elements 7 to employ the transmitting power P3. The speech encoder 2 selects for the third speech block the lowest speech coding rate S1, as a result of which the control unit 9 selects the channel coding C1 and the lowest transmitting power P1 . For the fourth speech block, the channel encoder 2 selects the speech coding rate S4, as a result of which the control unit 9 must select a lower channel coding rate C4 and a correspondingly a higher transmitting power P4. As a result of this, the transmitting power P varies constantly with the transfer rate used, which causes the average transmitting power $P_{AVE}$ to remain remarkably lower than the maximum transmitting power P5 required by the highest speech coding rate S5. In conventional mobile communications systems, in which the power level does not vary with the transfer rate, the transmitting power level is constantly set to level P5 according to the highest speech coding rate 5. The present invention thus results in remarkably lower average power levels and thus lower interference levels in the mobile network, facilitating the re-use of frequencies in the cellular network.

It must be noted that simultaneously with the power level setting according to the invention, standard power adjustment algorithms of the cellular radio network are also employed, said algorithms being used for taking into account the distance between the mobile station and the base station.

In a second embodiment of the invention, the extra capacity provided by the lower speech coding rate is not used for more effective channel coding, but for re-transmitting the same information in several successive time-slots. When bursts received in separate time-slots and containing the same information bits are combined in the receiver, a multipath fading diversity reception (time diversity reception) is achieved, which improves the interference tolerance of the connection. The transmitting power may thus be cut back by the amount that compensates the improved interference tolerance achieved by means of diversity reception so that the bit-error-rate of the connection substantially remains on the initial level. The speech coding rate may thus be utilized as a lower average transmitting power and thus as a lower interference level in the cellular network. This alternative embodiment will be described in the following again with reference to the block diagrams in FIGS. 1 and 2.

The transmitter of FIG. 1 is substantially similar to that in the preferred embodiment of the invention, except for the fact that the channel encoder 3 only has one channel coding available. Assume that the speech coding rate of the speech encoder 2 drops from the maximum rate to the half rate. Consequently, the number of speech information bits produced by the speech encoder 2 is reduced to a half. The control unit 9 is provided with information on a lower speech coding rate by the speech encoder and it directs the channel encoder 3 to a re-transmission mode. In the re-transmission mode the channel encoder 3 maintains the same channel coding as at the full rate, but it forms a channel coded speech block containing twice the speech information bits received from the speech encoder 2. Sub-blocks I and II of the channel coded speech block in FIG. 4, for instance, may contain the first speech information bits, and sub-blocks III and IV may contain the same speech information bits once more. The interleaver 4 interleaves the sub-blocks of the speech frame received from the channel encoder 3 in accordance with FIG. 4 into four successive time-slots TS4 to be transmitted in bursts to the receiver. Simultaneously, the control unit 9 directs the radio frequency elements 7 to use a lower transmitting power corresponding to half-rate speech encoding. A channel coded speech block may advantageously contain a control parameter that multiplies the same information contained in the speech block several times. In the example disclosed above, the same speech information was transmitted twice, but when the speech coding rate is reduced to one third, the number of re-transmissions may be three, when the speech coding rate is reduced to one fourth, the number of re-transmissions may be four, etc.

In the receiver, the multiple transmission of the speech information is utilized in time diversity reception. This may be carried out in a variety of alternative ways. In one embodiment of the invention, the deinterleaver 24 forms a speech block of bursts received in four successive time-slots TS4, said speech block being supplied to the channel decoder 23, as disclosed above. The channel decoder 23 decodes the speech block using the same channel coding method each time. It can thus detect on the basis of a control parameter contained by the channel coded speech block that the speech block contains the same information several times. The channel decoder 23 may make use of multiple speech information e.g. by selecting those speech information bits that have the lowest bit—error-rate and transmit these speech information bits to the speech decoder 22. The other speech information bits containing the same information are thus rejected. Alternatively, the channel decoder 23 may combine re-transmitted speech information bits with a suitable method and supply the combined speech information to the speech decoder 22.

The figures and the explanation associated therewith are only intended to illustrate the present invention. The invention may vary in its details within the scope and the spirit of the invention set forth in the attached claims.

What is claimed is:

1. A method for transmitting a user signal, particularly a speech or video signal on a circuit-switched connection in a cellular radio network when the bit rate of the user signal varies during transmission, wherein by allocating the circuit-switched connection a capacity that corresponds to the maximum bit rate of a variable-rate user signal, using the extra capacity of the circuit-switched connection for improving the interference tolerance of the connection when the bit rate of the user signal is lower than said maximum bit rate, reducing the transmitting power in proportion to the improved interference tolerance when the bit rate of the user signal is lower than said maximum bit rate.

2. A method as claimed in claim 1, wherein by reducing the transmitting power in proportion to the improved interference tolerance so that the bit-error-rate remains substantially constant.

3. A method as claimed in claim 1, wherein in that improving the interference tolerance of the transmitted signal comprises taking into use a more efficient channel coding.

4. A method as claimed in claim 1, wherein in that improving the interference tolerance of the transmitted signal comprises multiple transmission of user information bits for diversity reception.

5. A cellular radio network for transmitting a user signal, particularly a speech or video signal, on a circuit-switched connection, the bit rate of said signal varying during transmission, wherein in that the capacity of the circuit-switched connection corresponds to the maximum bit rate of the variable rate user signal, the system has available a plurality of channel codings having different efficiencies, one channel coding for each bit rate of the user signal so that the extra capacity of the circuit-switched connection is used for improving the interference tolerance of the connection when the bit rate of the user signal is lower than said maximum bit rate, the transmitting power depends on the channel coding used so that the transmitting power is reduced with the increasing efficiency of the channel coding while the bit-error-rate remains substantially constant.

6. A cellular radio network in which a user signal, particularly a speech or video signal, is transmitted on a circuit-switched connection, the bit rate of said signal varying during transmission, characterized in that the capacity of the circuit-switched connection corresponds to the maximum bit rate of the variable rate user signal, the system is arranged to use the extra capacity of the circuit-switched connection for multiple transmission of the user information bits in order to improve the interference tolerance of the system, said capacity being released when the bit rate of the user signal is less than or equal to a half of said maximum bit rate, the system is arranged to use the improved interference tolerance for reducing the transmitting power and thus the interference level of the system.

7. A transmitter for transmitting a user signal, particularly a speech or video signal, on a circuit-switched connection in a cellular radio system, said transmitter comprising a source (2) of a variable bit rate user signal, such as a speech or video encoder, a channel encoder (3), a radio transmitter unit (7) having an adjustable transmitting power, wherein in that the capacity allocated for the circuit-switched connection corresponds to the maximum rate of the user signal, the channel encoder (3) has, for the maximum bit rate of the user signal, a first, relatively the least efficient channel coding or no channel coding at all, and for each lower bit rate of the user signal, a relatively more efficient channel coding that utilizes the capacity of the circuit-switched connection, released by the lower transfer rate, for improving the interference tolerance of the connection, the transmitting power (Tx_POWER) of the radio transmitter unit (7) depends on the channel coding used by the channel encoder so that the transmitting power is reduced with the increasing efficiency of the channel coding while the bit-error-rate remains substantially constant.

8. A. transceiver for transmitting a user signal, particularly a speech or video signal, on a circuit-switched connection in a cellular radio system, comprising a source (2) of a variable bit rate user signal, such as a speech or video encoder, a channel encoder (3)

a channel decoder (23), a radio transmitter unit (7) having an adjustable transmitting power, a radio receiver unit (26), wherein in that the capacity allocated for the circuit-switched connection corresponds to the maximum rate of the user signal, the channel encoder (3) has, for the maximum bit rate of the user signal, a first, relatively the least efficient channel coding or no channel coding at all, and for each lower bit rate of the user signal, a relatively more efficient channel coding that utilizes the capacity of the circuit-switched connection, released by the lower transfer rate, for improving the interference tolerance of the connection, the transmitting power of the radio transmitter unit (7) depends on the channel coding used by the channel encoder so that the transmitting power is reduced with the increasing efficiency of the channel coding while the bit-error-rate remains substantially constant, the channel decoder (23) is arranged to test on the received signal said first and each one of said more efficient channel codings and to select the channel coding that has the smallest number of errors.

9. A transceiver for transmitting a user signal, particularly a speech or video signal, on a circuit-switched connection in a cellular radio system, comprising a source (2) of a variable bit rate user signal, such as a speech or video encoder, a channel encoder (3)

a channel decoder (23), a radio transmitter unit (7) having an adjustable transmitting power, a radio receiver unit (26), wherein in that the capacity allocated for the circuit-switched connection corresponds to the maximum rate of the user signal, the channel encoder (3) has, for the maximum bit rate of the user signal, a first, relatively the least efficient channel coding or no channel coding at all, and, for each lower bit rate of the user signal, a relatively more efficient channel coding that utilizes the capacity of the circuit-switched connection, released by the lower transfer rate, for improving the interference tolerance of the connection, the transmitting power of the radio transmitter unit (7) depends on the channel coding used by the channel encoder so that the transmitting power is reduced with the increasing efficiency of the channel coding while the bit-error-rate remains substantially constant, the transmitted signal contains the information on the used bit rate or the channel coding or a change thereof, the channel decoder (23) is arranged to select the channel coding for the received signal on the basis of said information.

10. A method as claimed in claim 2, characterized in that improving the interference tolerance of the transmitted signal comprises taking into use a more efficient channel coding.

11. A method as claimed in claim 2, characterized in that improving the interference tolerance of the transmitted signal comprises multiple transmission of user information bits for diversity reception.

* * * * *